(12) United States Patent
Xiao

(10) Patent No.: US 9,280,792 B2
(45) Date of Patent: Mar. 8, 2016

(54) NOTARIZATION BASED ON CURRENCY TRANSACTIONS

(71) Applicant: Empire Technology Development LLC, Wilmington, DE (US)

(72) Inventor: Zhen Xiao, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/006,310

(22) PCT Filed: Oct. 12, 2012

(86) PCT No.: PCT/CN2012/082851
§ 371 (c)(1),
(2) Date: Sep. 19, 2013

(87) PCT Pub. No.: WO2014/056185
PCT Pub. Date: Apr. 17, 2014

(65) Prior Publication Data
US 2014/0108223 A1    Apr. 17, 2014

(51) Int. Cl.
*G06Q 40/00* (2012.01)
*G06Q 40/04* (2012.01)
*G06Q 10/10* (2012.01)

(52) U.S. Cl.
CPC .............. *G06Q 40/04* (2013.01); *G06Q 10/10* (2013.01)

(58) Field of Classification Search
USPC ......................................... 705/35–45, 63–80
See application file for complete search history.

(56) References Cited

U.S. PATENT DOCUMENTS

| 6,039,248 | A |  | 3/2000 | Park et al. |
|---|---|---|---|---|
| 6,076,084 | A | * | 6/2000 | Harlan .............. G06F 17/30067 707/999.001 |
| 6,397,224 | B1 | * | 5/2002 | Zubeldia et al. |
| 7,020,782 | B2 | * | 3/2006 | Rajasekaran ..... G06F 17/30949 707/E17.036 |
| 7,039,616 | B2 | * | 5/2006 | Wendenburg et al. .......... 705/64 |
| 7,117,367 | B2 | * | 10/2006 | Carro .................. G06F 21/6218 380/28 |
| 7,167,844 | B1 | * | 1/2007 | Leong et al. .................... 705/80 |
| 7,213,005 | B2 | * | 5/2007 | Mourad et ...................... 705/64 |
| 7,231,373 | B2 | * | 6/2007 | Kidd et al. ...................... 705/75 |
| 7,735,144 | B2 |  | 6/2010 | Pravetz et al. |
| 7,752,136 | B2 | * | 7/2010 | Meadow ................ G06Q 20/04 235/375 |
| 8,244,767 | B2 | * | 8/2012 | Ancin et al. .................. 707/791 |
| RE44,542 | E | * | 10/2013 | Meadow ................ G06Q 20/04 380/54 |
| 2002/0032661 | A1 | * | 3/2002 | Schuba et al. .................. 705/64 |
| 2002/0156748 | A1 | * | 10/2002 | Wendenburg et al. .......... 705/80 |

(Continued)

FOREIGN PATENT DOCUMENTS

CN    101122985 A    2/2008

OTHER PUBLICATIONS

International Search Report from corresponding International Application No. PCT/CN12/082851 mailed Jul. 18, 2013.

(Continued)

*Primary Examiner* — Narayanswamy Subramanian
(74) *Attorney, Agent, or Firm* — Brundidge & Stanger, P.C.

(57) ABSTRACT

In one example, a method includes generating a first digital code that represents a content of a document created by a first user; and notarizing the creation of the document by triggering a plurality of remittances from a first account associated with the first user to a second account, with each of the plurality of remittances time-stamped and a respective amount of each of the plurality of remittances indicating a corresponding portion of the first digital code.

15 Claims, 5 Drawing Sheets

(56) References Cited

U.S. PATENT DOCUMENTS

| | | | |
|---|---|---|---|
| 2003/0172085 A1* | 9/2003 | Rajasekaran | G06F 17/30949 |
| 2003/0226012 A1* | 12/2003 | Asokan et al. | 713/156 |
| 2004/0024708 A1* | 2/2004 | Masuda et al. | 705/42 |
| 2007/0098172 A1* | 5/2007 | Levy et al. | 380/247 |
| 2008/0040284 A1* | 2/2008 | Hazel et al. | 705/64 |
| 2009/0006842 A1 | 1/2009 | Ross et al. | |
| 2009/0061831 A1* | 3/2009 | Shastry | 455/414.1 |
| 2010/0299333 A1* | 11/2010 | Osmond | G06F 17/30949 707/747 |
| 2011/0004549 A1* | 1/2011 | Gray et al. | 705/40 |
| 2011/0047419 A1* | 2/2011 | Garnier | G06F 21/32 714/701 |
| 2011/0087669 A1* | 4/2011 | Ancin et al. | 707/740 |
| 2011/0225165 A1* | 9/2011 | Burstein | 707/741 |
| 2012/0035751 A1* | 2/2012 | Dimitriadis | G06F 21/554 700/91 |
| 2012/0047180 A1* | 2/2012 | Kirshenbaum | G06F 17/30887 707/797 |
| 2012/0072730 A1* | 3/2012 | Winograd et al. | 713/176 |
| 2012/0198572 A1* | 8/2012 | Beals | G06F 21/42 726/34 |
| 2013/0018800 A1* | 1/2013 | Devaraju | 705/75 |
| 2013/0226902 A1* | 8/2013 | Lariba-Pey | G06F 17/30498 707/714 |
| 2013/0268610 A1* | 10/2013 | Kawai | G06Q 10/107 709/206 |

OTHER PUBLICATIONS

Bruce Schneier, Schneier on Security: SHA-1 Broken, Feb. 2005.
Jan O. Kechel, Public Timestamp, 2007.
"Bitcoin," Wikipedia, accessed at http://web.archive.org/web/20130915105655/http://en.wikipedia.org/wiki/Bitcoin, last modified on Sep. 4, 2013, pp. 1-20.
"Hash function," Wikipedia, accessed at http://web.archive.org/web/20130818164011/http://zh.wikipedia.org/wiki/Hash last modified Jul. 29, 2013, pp. 1-7.
"Public Timestamp," accessed at http://publictimestamp.org, accessed on Mar. 30, 2012, p. 1-1.
"Schneier on Security," accessed at http://web.archive.org/web/20120716180152/http://www.schneier.com/blog/archives/2005/02/cryptanalysis_o.html, Feb. 18, 2005, pp. 1-25.

* cited by examiner

400

DIGITAL CONTENT

402

(a)

HASH REPRESENTATION
404

389267145

(b)

DIVIDE & TIME STAMP HASH
406

389 (TS1)/267 (TS2)/145 (TS3)

(c)

SERIALIZE AS CURRENCY
408

NOTARIZATION BASED ON CURRENCY TRANSACTIONS

CROSS-REFERENCE TO RELATED APPLICATIONS

The present application is a U.S national stage filing under 35 U.S.C. §371 of PCT Application No. PCT/CN2012/082851, filed on Oct. 12, 2012.

TECHNICAL FIELD

The embodiments described herein pertain generally to notarizing, to ensure sustainable validation, of digital content by leveraging existing infrastructures for currency transactions.

BACKGROUND

Notarization, certification, and/or validation of digital content has become increasingly difficult as means and methods for modifying, manipulating, and/or tampering with the digital content have become more sophisticated and, therefore, more difficult to detect.

SUMMARY

In one example embodiment, a method includes generating a first digital code that represents a content of a document created by a first user; and notarizing the creation of the document by triggering a plurality of remittances from a first account associated with the first user to a second account, with each of the plurality of remittances time-stamped and a respective amount of each of the plurality of remittances indicating a corresponding portion of the first digital code.

In another example embodiment, a computer-readable medium stores instructions that, when executed, cause one or more processor to perform operations that include receiving a document having digital content, generating a first hash code having a plurality of digits based on the digital content of the document, and triggering a plurality of remittances from a first account to a second account such that at least a portion of an amount of each remittance indicates the one or more digits of a corresponding portion of the first hash code.

In yet another example embodiment, a system includes a first component that is configured to generate a first hash code having a plurality of digits based on a digital content of a document, a second component that is configured to segment the first hash code into a plurality of portions each having one or more digits of the plurality of digits of the hash code, and a third component that is configured to trigger a plurality of remittances from a first account to a second account such that at least a portion of an amount of each remittance indicates the one or more digits of a corresponding portion of the first hash code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIGS. 4(a)-4(d) show an example progression of digital data as processed in at least one flow of operations for notarization based on currency transactions, in accordance with at least some embodiments described herein;

DETAILED DESCRIPTION

Figure 1:
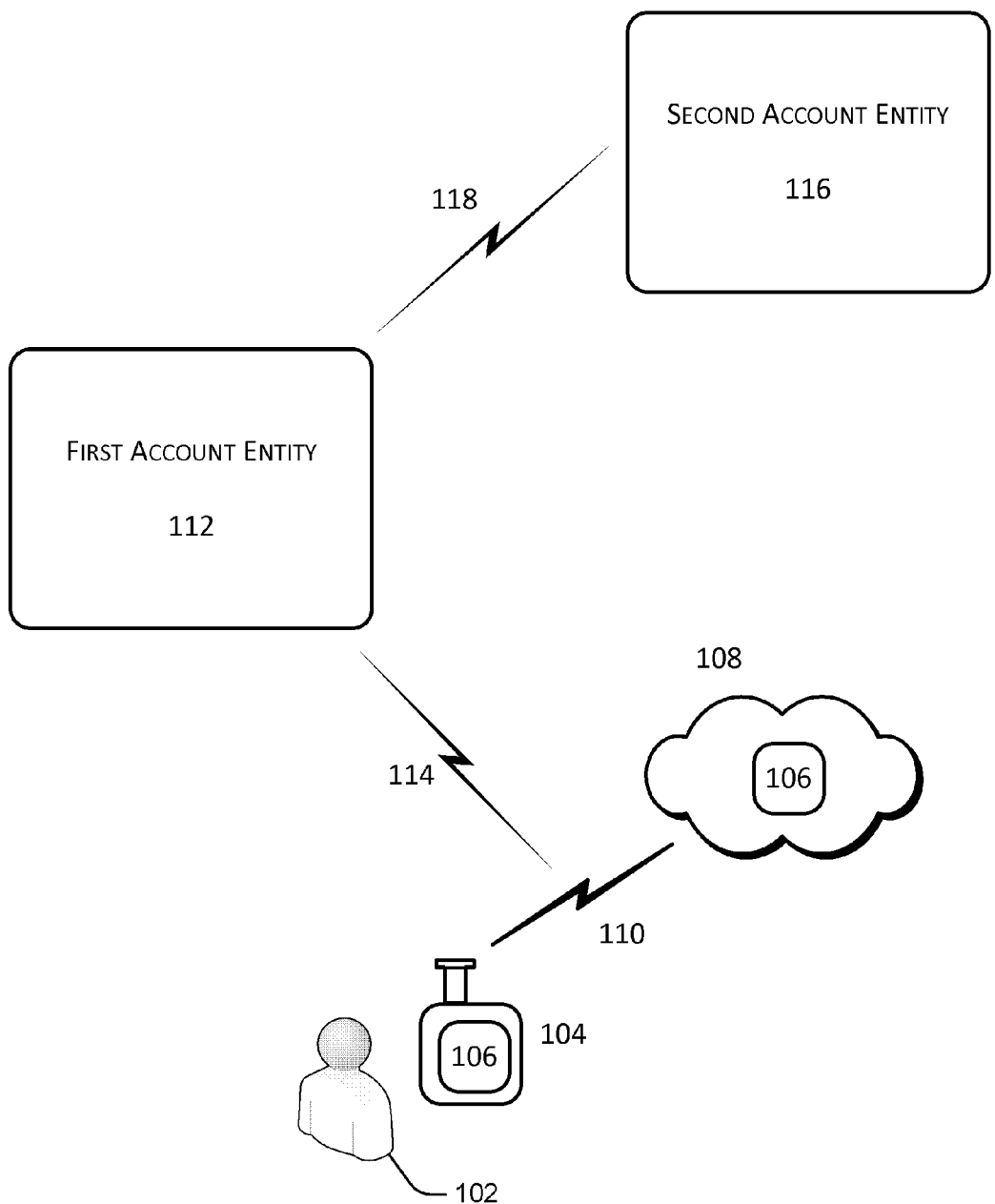
FIG. 1 shows an example system configuration in which notarization based on currency transactions may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which notarization based on currency transactions may be implemented, arranged in accordance with at least some embodiments described herein. As depicted, configuration 100 includes, at least, a client device 104 that may host and/or run an instance of an application 106 thereon, a service provider 108 having a platform that may alternatively host and/or run an instance of application 106 thereon, a first account entity 112, and a second account entity 116.

A user 102 may be regarded as a person or entity that exercises ownership or control of client device 104. For example, user 102 may be a person who desires to notarize, certify, or otherwise ensure sustained validation of contents of one or more digital files. Alternatively, user 102 may be an individual or organizational entity that desires or intends to implement and sustain validation of the properties and/or content of a continuous stream of digital files. Such examples are non-limiting, but rather are intended to merely give a sense of the breadth of possibilities by which user 102 may be embodied.

As described herein, non-limiting examples of a "digital file" may refer to any document, e.g., contract, will, purchase agreement, medical record, laboratory notebook, etc; or digital media file, e.g., photograph, video file, audio file, software application, computer program; etc. As referenced herein, user 102, as an individual or entity, may desire or intend to ensure future validation of one or more of such digital files by presently notarizing or certifying the content of the one or more digital files, in accordance with one or more of the presently described embodiments of notarization based on currency transactions, by hashing the content of the one or more digital files in a manner that may be verified by an independent third-party.

As further referenced herein, "notarize," "certify," and/or "validate" may be alternately used to refer to the act and/or process of authenticating as legitimate the content of one or more digital files. The legitimacy of the one or more digital files may be determined based on factors that include, but are not limited to, matching the content of the one or more digital files at the time of creation to that at the time of attempted authentication.

Client device 104 may refer to a processor-based electronic device on which an instance of application 106 may be hosted to implement at least portions of notarization based on currency transactions. Alternatively, client device 104 may be configured to be communicatively coupled to service provider 108 having a platform on which an instance of application 106 may be hosted to also implement at least portions of notarization based on currency transactions.

Client device 104 may be implemented as a mobile (or portable) electronic device such as a mobile phone, cell phone, smartphone, personal data assistant (PDA), a personal media player device, an application specific device, or a hybrid device that includes any of the above functions. Client device 104 may also be implemented as a personal computer including tablet, laptop computer, and non-laptop computer configurations, which may be connected to a wireless, wired, or mobile communications network.

A wireless service provider for implementing communications for client device 104 may alternatively be referred to as a mobile network carrier, wireless carrier, or even cellular company. Regardless of the alternate reference, the wireless service provider may provide network communication services for mobile communications subscribers. Non-limiting examples of such network communication services may include telephone communication services and internet connectivity services. Client device 104 may be configured to communicate with service provider 108, first account entity 112, and/or second account entity 116, each of which may similarly communicate with each other. Further, client device 104 may be configured to communicate with first account entity 112 directly in a peer-to-peer networking environment.

Application 106 may refer to a program implemented by hardware, software, firmware, or any combination thereof that may be utilized to notarize contents of one or more digital files that are created, received, and/or stored on client device 104. In some embodiments, application 106 may be included in, or otherwise integrated with, transactional software (not shown) in order to implement notarization based on currency transactions. That is, application 106 hosted on client device 104 may enable client device 104 to, at least, hash the contents of the one or more digital files and to engage with first account entity 112 to trigger a currency transaction between first account entity 112 and second account entity 116. By "engaging" with first account entity 112, application 106 may transmit parameters for at least one such currency transaction to first account entity 112; with the aforementioned parameters including, at least, representations of the amounts of currency to be remitted from first account entity 112 to second account entity 116, as determined by the hashed content of the one or more digital files. The aforementioned currency transaction may include a series of sub-transactions, or remittances, for which the amounts to be transacted are based on a serialization of time-stamped, equal-sized segments of the hash of the contents of the one or more digital files. Thus, as application 106 transmits the serialized, time-stamped, equal-sized segments of the hash of the content of the one or more digital files to first account entity 112, a currency transaction may be considered to be "triggered" or otherwise initiated in accordance with at least some of the embodiments described herein.

Further, in accordance with at least some embodiments of notarization based on currency transactions, the aforementioned currency transaction may further include application 106 receiving confirmation from first account entity 112 that the currency transaction between first account entity 112 and second account entity 116 has been completed. Thus, the embodiments described herein may provide a reliable mechanism for ensuring sustainable validation and/or authentication of the content of the one or more digital files by providing a notarized version of a hash of the content of the one or more digital files. That notarized version of the hash may come in the form of the serialized, time-stamped sub-transactions, or remittances, that are included in the confirmation, and which may be reassembled to form the hash of the content of the one or more digital files.

Service provider 108 may refer to a cloud-based service and storage platform owned and/or operated by a third-party service provider. Service provider 108 may include a platform framework of hardware, software, firmware, or any combination thereof, on which application 106 may be hosted and/or executed for one or more digital files that are received from client device 104. More particularly, service provider 108 may be implemented as a web-based storage and sharing service to which client device 104, first account entity 112, and/or second account entity 116 may register prior to use.

First account entity 112 may refer to a service and/or storage platform owned and/or operated by a financial institution, brokering entity, government entity, etc., that holds a currency account on behalf of user 102 that may be accessed in accordance with at least one example implementation of notarization based on currency transactions. Regardless of the title, description, or any affiliation thereof, first account entity 112 may facilitate a currency transaction with second account entity 116, on behalf of user 102, to ensure sustained validation of contents of one or more digital files that are created on client device 104, received at client device 104, stored on client device 104, and/or received from client device 104. The services provided by first account entity 112, on behalf of user 102, in accordance with at least some of the embodiments described herein, may be implemented based on a contract established by user 102 and first account entity 112. The aforementioned currency transaction may include a series of sub-transactions, or remittances, by which the amounts transacted are based on the aforementioned serialization of time-stamped, equal-sized segments of a hash of the contents of the one or more digital files.

Second account entity 116 may refer to a service and/or storage platform owned and/or operated by a separate financial institution, brokering entity, government entity, etc., that may serve as an independent participant in notarization based on currency transactions. Regardless of title, description, or even any affiliation thereof, second account entity 116 may participate in implementation of the currency transaction with first account entity 112 by transmitting a confirmation of at least a portion of the currency transaction from first account entity 112 and/or by reciprocating the receipt of the aforementioned series of sub-transactions, or remittances, with a repayment of the amounts in the sub-transactions back to first account entity 112. In at least some embodiments, a service fee for participation in the currency transaction may be withheld by second account entity 116 prior to processing the reciprocal repayment back to first account entity 112.

Communication link 110 may refer to a communication link enabled by a protocol utilized to transmit data and/or information between application 106, via client device 104, and service provider 108.

Communication link 114 may refer to a communication link enabled by a protocol utilized to transmit data and/or information, including instructions to trigger a currency transaction, between client device 104 or service provider 108, whichever is hosting an active instance of application 106, and first account entity 112.

Communication link 118 may refer to a communication link enabled by a protocol utilized to transmit data and/or information pertaining to a currency transaction between first account entity 112 and second account entity 116.

The aforementioned protocols referring to communication links 110, 114, and 118 may include any mobile communications technology, e.g., Global System for Mobile Communications (GSM), Code Division Multiple Access (CDMA), etc., depending upon the technologies supported by particular wireless service providers to which services client device 104, service provider 108, first account entity 112, and/or second account entity 116 may be assigned or subscribed. Further, one or more of the aforementioned communication links 110, 114, and 118 may be implemented utilizing non-cellular technologies such as conventional analog AM or FM radio, Wi-Fi™, wireless local area network (Wireless Local Area Network (WLAN) or IEEE (Institute of Electrical and Electronics Engineers) 802.11), (Worldwide Interoperability for Microwave Access) WiMAX™, Bluetooth™, hard-wired connections, e.g., cable, phone lines, and other analog and digital wireless voice and data transmission technologies.

Thus, FIG. 1 shows an example implementation of a system configuration for notarization based on currency transactions.

Figure 2:
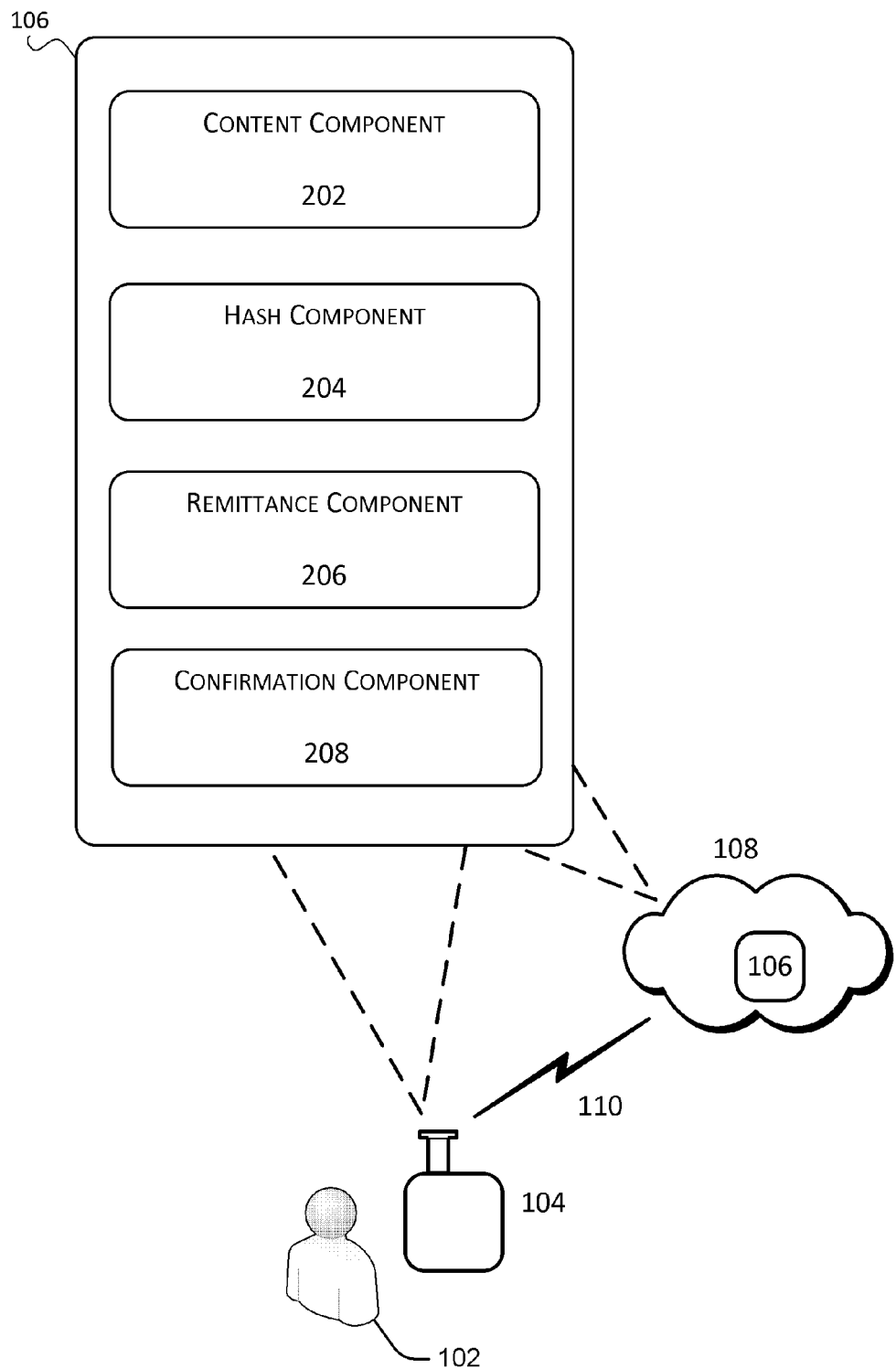
FIG. 2 shows an example configuration of an application for implementing notarization based on currency transactions, arranged in accordance with at least some embodiments described herein.

FIG. 2 shows an example configuration of application 106 for implementing notarization based on currency transactions, arranged in accordance with at least some embodiments described herein. As depicted, application 106, which may be hosted and/or run on one or both of client device 104 and the platform of service provider 108, may include at least a content component 202, a hash component 204, a remittance component 206, and a confirmation component 208; however, this configuration is an example only, and is not intended to be limiting in any manner.

As stated previously, client device 104 may refer to a processor-based electronic device on which an instance of application 106 may be hosted to implement at least portions of notarization based on currency transactions. Alternatively, client device 104 may be configured to be communicatively coupled to service provider 108 having a platform on which an instance of application 106 may be hosted to also implement at least portions of notarization based on currency transactions. Service provider 108 may refer to a cloud-based service and storage platform on which application 106 may be hosted and/or executed for one or more digital files that are created on or received from client device 104.

Content component 202 may refer to a module or component of application 106 that is configured, designed, and/or programmed to identify and/or access, based on user or automated input, one or more digital files for processing by application 106. For application 106 hosted on client device 104, the one or more digital files may be created at, received at, and/or stored on client device 104. For application 106 hosted on service provider 108, the one or more digital files may be received from client device 104. Thus, content component 202 may access the one or more digital files for processing, identified by user or automated input, by downloading the one or more digital files from a network source or retrieving the one or more digital files from a local storage.

Hash component 204 may refer to a module or component of application 106 that is configured, designed, and/or programmed to hash the content of the one or more digital files that are identified and/or accessed by content component 202. Hash component 204 may utilize a hash algorithm, e.g., Message-Digest 5 (MD5) or Secure Hash Algorithm-1 (SHA-1), to map the content of the one or more digital files to a smaller data set of fixed length. The hash algorithm effectively generates a digital code to represent the content of the one or more digital files.

Remittance component 206 may refer to a module or component of application 106 that is configured, designed, and/or programmed to trigger or initiate a currency transaction, including a series of one or more remittances, between first account entity 112 and second account entity 116. Remittance component 206 may transmit, or cause to be transmitted, the hash code generated by hash component 204 to first account entity 112. The hash code transmitted to first account entity 112, from either of client device 104 or service provider 108, may be segmented into multiple groups of one or more digits, each of equal length. Further, for future authentication purposes, each of the multiple groups may be time-stamped by hash component 204 or remittance component 206, and transmitted in series to first account entity 112. That is, each of the multiple groups may include encoded information that identifies, at least, a date and time at which, e.g., the content of the one or more digital files is hashed or the resulting hash code is segmented into the respective multiple groups. The format of the time stamps may be subject to customization by an entity that exercises administrative control over application 106.

Thus, by transmitting the time-stamped, equally-sized multiple groups of digits to first account entity 112, thus informing first account entity 112 of the currency amounts to be remitted to second account entity 116, remittance component 206 effectively "triggers" or otherwise initiates a currency transaction, in accordance with at least some of the embodiments described herein.

Upon transmission to first account entity 112, each of the multiple groups of the segmented hash code may represent an order for a currency transaction, on behalf of user 102, between first account entity 112 and second account entity 116. More particularly, as configured, designed, and/or programmed as part of application 106, the digits included in of each of the groups of the segmented hash code may represent a currency amount that is to be transferred from a first account for user 102 at first account entity 112 to second account entity 116. The transferred amount of currency may be received at second account entity 116, e.g., into an account designated for user 102 or into a general account that may be designated for use for notarization based on currency transactions.

As stated above, each of the multiple groups of the segmented hash code may represent a U.S. dollar amount that is to be transferred from first account entity 112 to second account entity 116, on behalf of user 102. By way of example, if each of the multiple groups of the segmented hash code includes three digits, the first digit may represent a dollar amount and the second digit may represent a cents amount to be remitted to second account entity 116.

Further to the example, a sample hash code generated by hash component 204 may be 389267145. Thus, the first group of digits including "389" may be understood by first account entity 112 as an instruction to remit $3.89 to second account entity 116; the second group of digits including "267" may be understood by first account entity 112 as an instruction to further remit $2.67 to second account entity 116; and the third group of digits including "145" may be understood by first account entity 112 as an instruction to further remit $1.45 to second account entity 116.

Alternatively, to reduce the amounts to be remitted, if each of the multiple groups of the segmented cash code includes two digits to represent a cents amount to be remitted to second account entity 116, an ordinal number, i.e., the number representing the placement in a serialization of the multiple groups, may represent the dollar amount. Thus, using the example hash code 389267145 generated by hash component 204, an alternative first group of digits may include "38," which may be understood by first account entity 112 as an instruction to remit $1.38 to second account entity 116; an alternative second group of digits may include "92," which may be understood by first account entity 112 as an instruction to remit $2.92 to second account entity 116; an alternative third group of digits may include "67," which may be understood by second account entity 116 as an instruction to remit $3.67 to second account entity 116; an alternative fourth group of digits may include "14," which may be understood by first account entity 112 as an instruction to remit $4.14 to second account entity 116; and an alternative fifth group of digits may include "5," which may be understood by first account entity 112 as an instruction to remit $5.50 to second account entity 116.

Thus, in accordance with the present non-limiting example, the currency transaction based on the hash code produced by hash component 204 may trigger a currency transaction that includes serial, time-stamped instructions to remit $3.89, $2.67, and $1.45 from a first account for user 102 at first account entity 112 to second account entity 116; or alternatively, a currency transaction that include serial, time-stamped instructions to remit $1.38, $2.92, $3.67, $4.14, and $5.50 from the account for user 102 at first account entity to second account entity 116. As noted, the remittances are serial, based on the segmented order of the hash code produced by hash component 204, in order to preserve the integrity of the hash code; further, each of the groups of digits may be encoded or otherwise affixed with a time stamp. Thus, as received and recorded at second account entity 116, the serial remittances, when juxtaposed in order of transmission/receipt and voided of any reference to currency and corresponding time stamps, may provide a representation of the hash code generated by hash component 204, which is a hash of the content of the one or more digital files created at, received by, or received from client device 104.

Application 106, as seen from the examples described above, may be configured, designed, and/or programmed to accommodate the number of digits per segmented group to multiple national currencies. Therefore, the number of digits referenced herein is described in the context of non-limiting examples, although the number of digits may be influenced by minimal transactional amounts accepted and/or required by at least second account entity 116. Further, the currency transactions may be implemented utilizing a network currency, e.g., "BitCoin," that accommodates small acceptable transfer amounts and relatively quick completion rates.

Further still, application 106 may be alternatively configured, designed, and/or programmed to serially transmit the time-stamped remittances in an order that is different than the order of the corresponding digits in the generated hash code, so long as the hash code may be reconstructed based on the remittances by any one or more of application 106, first account entity 112, or second account entity 116.

Confirmation component 208 may refer to a module or component of application 106 that is configured, designed, and/or programmed to receive and/or record a confirmation of the remittances between first account entity 112 and second account entity 116. Further, in accordance with at least some embodiments, confirmation component 208 may store an alternative version of the confirmation of the remittances, with references to currency and time stamps removed therefrom. Thus, the alternative version of the confirmation of the remittances may be regarded as a reconstruction of the hash code generated by hashing the content of the one or more digital files.

Upon transmission to second account entity 116, with each of the multiple groups of the segmented hash code representing a currency transaction from first account entity 112, second account entity 116 may be configured, designed, and/or programmed to return the remitted currency amounts back to the first account for user 102 at first account entity 112, along with a confirmation of receipt. However, in accordance with various business models associated with embodiments of notarization based on currency transactions, second account entity 116 may return the remitted currency amounts back to first account entity 112 with an agreed upon service charge withheld. Regardless of the amount of currency returned to first account entity 112, the listing of the time-stamped remittances from first account entity 112 to second account entity 116 on the confirmation of receipt may provide the basis of a representation of the hash code generated by hash component 204 that is notarized or certified to ensure sustainable validation thereof. Further, in accordance with various embodiments of notarization based on currency transactions, remittance component 206 may trigger or initiate multiple remittances, with the currency amounts based on segmented groups of the hash code generated by hash component 204, between first account entity 112 and second account entity 116. Receipt of the confirmation of the currency exchanges may be transmitted from first account entity 112 to application 106, although alternative embodiments of notarization based on currency transactions may contemplate second account entity 116 transmitting confirmation of the serial remittances directly to application 106.

Thus, FIG. 2 shows an application by which a time-stamped representation of the hash code generated by hash component 204 may be generated, to provide a sustainable validation of the content of one or more digital files created at, received by, or received from client device 104.

Figure 3:
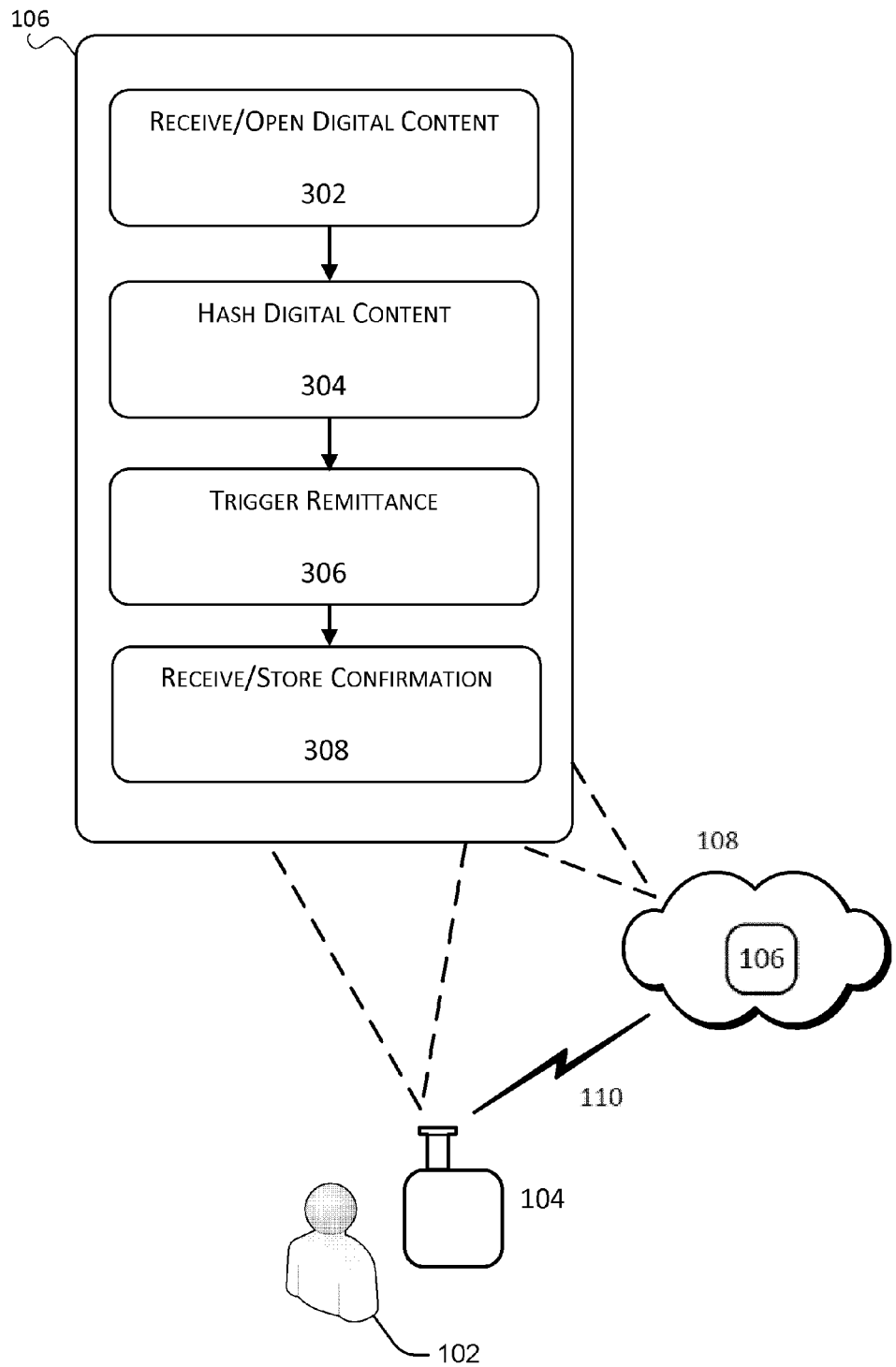
FIG. 3 shows an example configuration of a processing flow of operations for notarization based on currency transactions, arranged in accordance with at least some embodiments described herein.

FIG. 3 shows an example configuration of a processing flow 300 of operations for notarization based on currency transactions, arranged in accordance with at least some embodiments described herein. As depicted, processing flow 300 may include sub-processes executed by various components that are included as part of application 106, as hosted and/or run on either of client device 104 or the platform of service provider 108. However, processing flow 300 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, and/or 308. Processing may begin at block 302.

Block 302 (Receive/Open Digital Content) may refer to content component 202 identifying and/or preparing, based on user input, one or more digital files for processing by application 106. For application 106 hosted on client device 104, the one or more digital files may be created, received, and/or stored on client device 104. For application 106 hosted on service provider 108, the one or more digital files may be received from client device 104. Processing flow 300 may continue from block 302 to block 304.

Block 304 (Hash Digital Content) may refer to hash component 204 hashing the content of the one or more digital files that are identified and/or accessed by content component 202. Hash component 204 may utilize any known hash algorithm, e.g., MD5 or SHA-1, that has been configured to map the content of the one or more digital files to a smaller data set of a known and fixed length in order to generate a digital code to represent the content of the one or more digital files. Processing flow 300 may continue from block 304 to block 306.

Block 306 (Trigger Remittance) may refer to remittance component 206 triggering or initiating a currency transaction, which may include a series of one or more remittances, between first account entity 112 and second account entity 116 by transmitting, to first account entity 112, representations of the amounts of currency amounts to be remitted to second account entity 116. The triggering of the currency transaction may include the transmission of the hash code generated by hash component 204 to first account entity 112 from either of client device 104 or service provider 108. The transmitted hash code may be segmented into multiple groups of equal length and each of the multiple groups may be time-stamped by hash component 204 or remittance component 206, prior to or concurrent with the serial transmission thereof to first account entity 112.

In accordance with at least some embodiments of the currency transaction triggered or initiated by remittance component 206, each of the multiple groups of the segmented hash code may represent for a parameter for the currency transaction. That is, the digits included in of each of the groups of the segmented hash code may represent a currency amount that is to be transferred from a first account for user 102 at first account entity 112 to second account entity 116. The transferred amount of currency may be received at second account entity 116, e.g., into an account designed by or for user 102 or into a general account that may be designated for use for notarization based on currency transactions.

Application 106 may be configured, designed, and/or programmed so that the number of digits per segmented group may vary to accommodate multiple national currencies on a small but acceptable scale. Further, the currency transactions may be implemented utilizing a network currency, e.g., "BitCoin," that accommodates small acceptable transfer amounts and relatively quick completion rates. Further still, application 106 may be alternatively configured, designed, and/or programmed to serially transmit the time-stamped remittances in an order that is different than the order of the corresponding digits in the generated hash code, so long as the hash code may be reconstructed based on the remittances by any one or more of application 106, first account entity 112, or second account entity 116. Processing flow 300 may continue from block 306 to block 308.

Block 308 (Receive/Store Confirmation) may refer to confirmation component 208 receiving and/or recording a confirmation of the remittances between first account entity 112 and second account entity 116. Second account entity 116 may be configured, designed, and/or programmed to return remitted currency amounts back to the first account for user 102 at first account entity 112, along with a confirmation of receipt. Regardless of the amount of currency returned to first account entity 112, the listing of the time-stamped remittances on the confirmation of receipt, with any reference to currency and time stamps removed therefrom, may provide a reconstruction or representation of the hash code generated by hash component 204. Accordingly, the confirmation of receipt of the currency exchanges, transmitted from first account entity 112 to application 106, may be received by confirmation component 208. Confirmation component 208 may then cause the confirmation of receipt to be stored locally on client device 104 and/or at service provider 108, thus preserving a verifiable notarization, certification, and/or authentication of a hash code representation of the one or more digital files created on, stored on, or received from client device 104.

Thus, FIG. 3 shows an example processing for ensuring a sustainable authentication of a hash code representation of one or more digital files.

FIGS. 4(a)-4(d) show an example progression 400 of digital data as processed in at least one flow of operations for notarization based on currency transactions, in accordance with at least some embodiments described herein. As depicted, progression 400 generally depicts digital data in accordance with respective components of application 106 and respective blocks of processing flow 300, as described herein. Progression 400 is not limited to the example embodiments of FIGS. 4(a)-4(d), as obvious variations may be realized made, e.g., in accordance with different hash functions utilized by hash component 204, different national currencies utilized by application 106, different business models agreed upon by owners/controllers of first account entity 112 and/or second account entity 116, etc.

FIG. 4(a) shows an example representation 402 of the content of one or more digital files that have been created, received, and/or stored on client device 104 or received at service provider 108 from client device 104. Non-limiting examples of the digital files may include a document, e.g., contract, will, purchase agreement, medical record, laboratory notebook, etc; and/or digital media file, e.g., photograph, video file, audio file, software application, computer program; etc. User 102, as an individual or entity, may desire or intend to ensure future validation of the one or more digital files by presently notarizing or certifying. Representation 402 of the content of the one or more digital files may further be identified and/or accessed, based on user or automated input, for further processing by application 106.

FIG. 4(b) shows an example representation 404 of the hash code of the content of the one or more digital generated by hash component 204. The representation 404 of the hash code may be generated by a hash algorithm, e.g., MD5 or SHA-1, to convert the content of the one or more digital files to a smaller data set of a known and fixed length in order to generate a digital code to represent the content thereof.

FIG. 4(c) shows an example representation 406 of the hash code which may be segmented one or more groups of equal length, and each of the multiple groups may be time-stamped, by hash component 204 or remittance component 206. That is, each of the groups may include encoded information that identifies, at least, a date and time at which, e.g., the content of the one or more digital files is hashed or the resulting hash code is segmented into the respective multiple groups. The format of the time stamps may be subject to customization by an entity that exercises administrative control over application 106.

Thus, in accordance with the example of FIG. 2, by which the generated hash code is 389267145, the first group of digits including "389," which may be understood by first account entity 112 as an instruction to remit $3.89 to second account entity 116, may be time-stamped with time-stamp "TS1," which represents an actual time of hashing or transmission. The second group of digits including "267," which may be understood by first account entity 112 as an instruction to further remit $2.67 to second account entity 116, may be time-stamped with time-stamp "TS2," which represents an actual time of hashing or transmission; and the third group of digits including "145," which may be understood by first account entity 112 as an instruction to further remit $1.45 to second account entity 116, may be time-stamped with time-stamp "TS3," which represents an actual time of hashing or transmission.

FIG. 4(d) shows an example representation 408 of the serial transmission of the currency transaction from first account entity 112 to second account entity 116, in the form of a series of one or more remittances. In accordance with at least some of the non-limiting examples described herein, the currency transaction based on the hash code produced by hash component 204 may trigger a currency transaction that includes serial, time-stamped remittances of H1=$3.89, H2=$2.67, and H3=$1.45 from a first account for user 102 at first account entity 112 to second account entity 116. Thus, as received and recorded at second account entity 116, the serial, time-stamped remittances, when juxtaposed in order of transmission and/or receipt and voided of any references to currency or time, may provide a reconstruction or representation of the hash code generated by hash component 204, which is a hash of the content of the one or more digital files created at, received by, or received from client device 104.

Accordingly, FIGS. 4(a)-4(d) show an example progression of the processing of digital data in accordance with various embodiments of notarization based on currency transactions.

Figure 5:
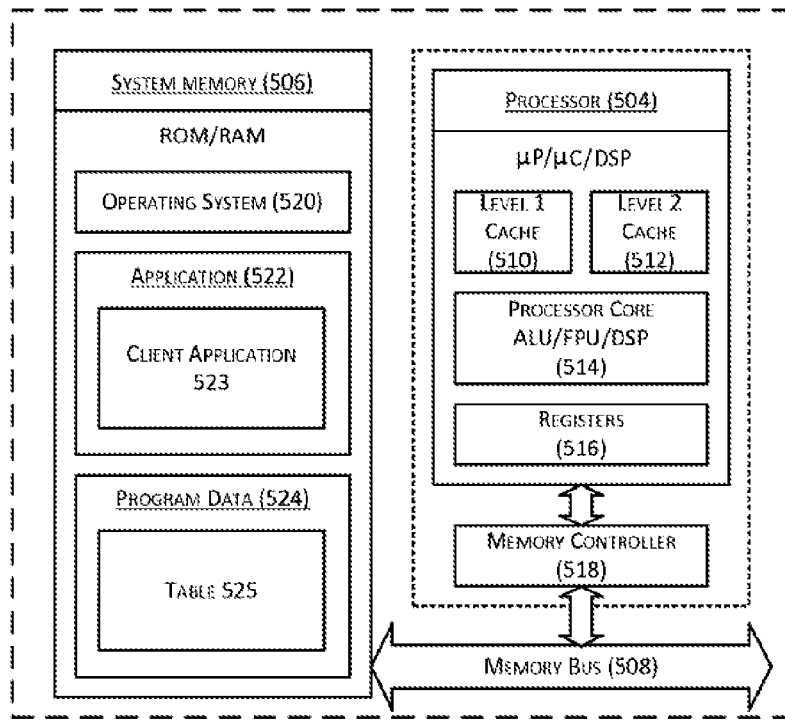
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for notarization based on currency transactions.

In a very basic configuration, a computing device 500 may typically include one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. The processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520; one or more applications 522, including application 106; and program data 524.

Application 522, which may include a client application 523 (e.g., application 106), may be configured to transmit or receive identification information pertaining to client device 104, service provider 108, first account entity 112, and/or second account entity 116, and further transmit device data as described previously with respect to FIGS. 1-3. Program data 524 may include a table 525, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A processor-based electronic device implemented method, comprising:
   generating, by a processor-based electronic device comprising a hash component, a first hash code having a plurality of digits using a hash function with a content of a document as an input;
   segmenting, by the processor-based electronic device comprising the hash component, the first hash code into a plurality of groups of one or more digits of the plurality of digits of the hash code;
   triggering, by a processor-based electronic device comprising a remittance component, a plurality of remittances from a first account to a second account with at least a portion of an amount of each remittance indicating a corresponding group of one or more digits among the plurality of groups of one or more digits;
   obtaining, by a processor-based electronic device comprising a confirmation component, a record indicating an identity of a party associated with the first account, amounts of the plurality of remittances, and a date of the plurality of remittances;
   reconstructing, by the processor-based electronic device comprising the hash component, the first hash code based on the amounts of the plurality of remittances as indicated in the record;
   generating, by the processor-based electronic device comprising the hash component, a second hash code using the content of the document as the input to the hash function; and
   notarizing, by the processor-based electronic device comprising the confirmation component, the document when the second hash code matches the first hash code.

2. The method of claim 1, wherein the content of the document comprises a digital form of a text, a still image, a video file, an audio file, a medical record, or a combination thereof.

3. The method of claim 1, wherein the segmenting the first hash code into the plurality of groups of one or more digits comprises segmenting the first hash code into the plurality of groups of one or more digits that are of equal length.

4. The method of claim 1, wherein the triggering comprises time stamping each of the plurality of remittances.

5. The method of claim 1, wherein the segmenting the first hash code into the plurality of groups of one or more digits comprises segmenting the first hash code into a series of groups of one or more digits.

6. The method of claim 5, wherein the triggering the plurality of remittances comprises triggering the plurality of remittances sequentially such that a respective order of time of each remittance reflects a serial order of a corresponding group in the series of groups of one or more digits.

7. The method of claim 5, wherein the triggering the plurality of remittances comprises triggering the plurality of remittances in an order of value such that a respective order of value of each remittance reflects a serial order of a corresponding group in the series of groups of one or more digits.

8. The method of claim 1, wherein the first account comprises an account associated with an author of the document.

9. The method of claim 1, wherein the second account comprises an account associated with a public notary.

10. The method of claim 1, wherein the obtaining the record comprises obtaining the record from a bank associated with the first account or the second account or from a digital currency system.

11. A system, comprising:
    a processor-based electronic device comprising a hash component that:
      generates a first hash code having a plurality of digits based on a digital content of a document, and
      generates a second hash code based on the digital content of the document;
    a processor-based electronic device comprising a remittance component that:
      segments the first hash code, generated by the hash component, into a plurality of portions each having one or more digits of the plurality of digits of the hash code, and
      triggers a plurality of remittances from a first account to a second account such that at least a portion of an amount of each remittance indicates the one or more digits of a corresponding portion of the first hash code; and
    a processor-based electronic device comprising a confirmation component that:
      obtains a record indicating an identity of a party associated with the first account, amounts of the plurality of remittances, and a date of the plurality of remittances,
      reconstructs the first hash code based on the amounts of the plurality of remittances as indicated in the record,
      compares the first hash code with the second hash code, and
      indicates that the document was created by the party identified in the record on the date of the plurality of remittances when the second hash code and the first hash code match.

12. The system of claim 11, wherein the processor-based electronic device comprising the remittance component triggers the plurality of remittances sequentially such that a respective order of time of each remittance reflects a serial order of the one or more digits of the corresponding portion of the first hash code.

13. The system of claim 11, wherein the processor-based electronic device comprising the remittance component triggers the plurality of remittances in an order of value such that a respective order of value of each remittance reflects a serial order of the one or more digits of the corresponding portion of the first hash code.

14. The system of claim 11, wherein the processor-based electronic device comprising the confirmation component obtains the record from a bank associated with the first account or the second account or from a digital currency system.

15. A non-transitory computer-readable medium storing executable instructions that, in response to being executed, causes a processor-based electronic device to perform operations comprising:
    generating, by a processor-based electronic device comprising a hash component, a first hash code having a plurality of digits using a hash function with a content of a document as an input;

segmenting, by the processor-based electronic device comprising the hash component, the first hash code into a plurality of groups of one or more digits of the plurality of digits of the hash code;

triggering, by a processor-based electronic device comprising a remittance component, a plurality of remittances from a first account to a second account with at least a portion of an amount of each remittance indicating a corresponding group of one or more digits among the plurality of groups of one or more digits;

obtaining, by a processor-based electronic device comprising a confirmation component, a record indicating an identity of a party associated with the first account, amounts of the plurality of remittances, and a date of the plurality of remittances;

reconstructing, by the processor-based electronic device comprising the hash component, the first hash code based on the amounts of the plurality of remittances as indicated in the record;

generating, by the processor-based electronic device comprising the hash component, a second hash code comprising the content of the document as the input to the hash function; and notarizing, by the processor-based electronic device comprising the confirmation component, the document when the second hash code matches the first hash code.

* * * * *